G. POLLARD.
SPEED CHANGING AND REVERSING GEAR.
APPLICATION FILED DEC. 5, 1917.

1,282,932.

Patented Oct. 29, 1918.
2 SHEETS—SHEET 1.

Inventor:
George Pollard
by Foster Freeman Watson & Coit
Attys.

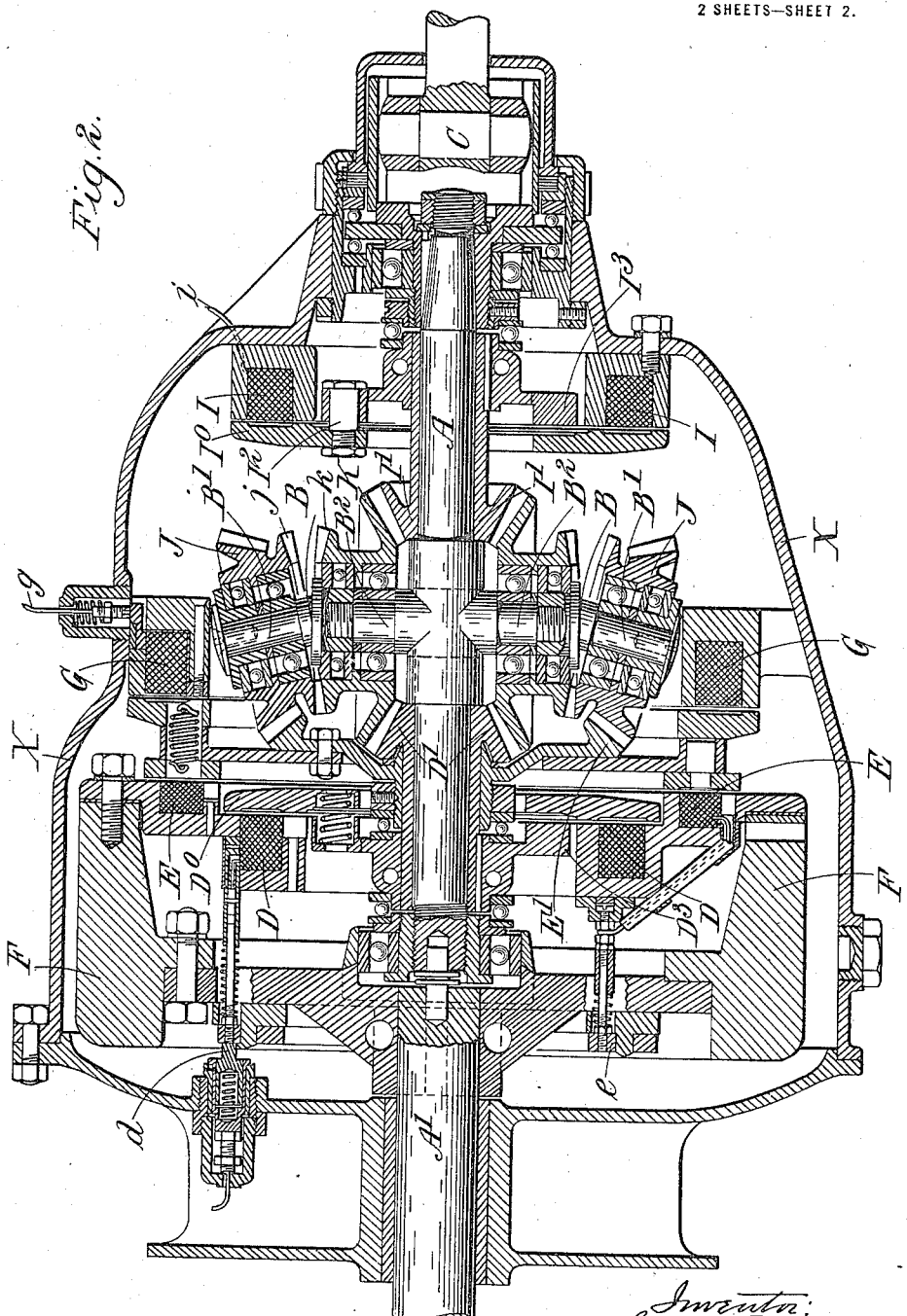

UNITED STATES PATENT OFFICE.

GEORGE POLLARD, OF WESTMINSTER, ENGLAND, ASSIGNOR TO THE MENCO-ELMA SYNDICATE LIMITED, OF LONDON, ENGLAND.

SPEED-CHANGING AND REVERSING GEAR.

1,282,932. Specification of Letters Patent. Patented Oct. 29, 1918.

Application filed December 5, 1917. Serial No. 205,618.

*To all whom it may concern:*

Be it known that I, GEORGE POLLARD, a subject of the King of England, residing at Piccadilly, in the city of Westminster, England, have invented an Improved Speed-Changing and Reversing Gear, of which the following is a specification.

This invention relates to improvements upon an electro-magnetic epicyclic speed-changing and reversing gear which is already known—see the earlier British Patent No. 110,020 of Pollard and The Menco-Elma Syndicate Limited—and which in certain of its forms is capable of serving also as an electro-magnetic brake.

The gear above referred to as already known (hereinafter termed for the sake of brevity the "tilted shaft" gear) comprised an inclined planetary shaft (the "tilted shaft") or shafts fixed to the driven shaft the latter constituting the one route by which the power put into the mechanism by the driving-shaft could be taken out of it, and it comprised also planet-gears loose on the inclined planetary shaft but attached to one another; the said planet-gears were co-axial.

The two earlier specifications cited above show that the designer enjoyed in the design of those gears, in which the axis of the co-axial planetary pinions was inclined, what was therein termed a third degree of freedom, as compared with two degrees of freedom which were all that were previously available to him in still earlier gears in which latter the axis of the co-axial planetary pinions was at right angles to the driving and driven shafts, instead of being tilted.

The present invention has for its object to give the designer a still greater freedom of choice than even the three degrees aforesaid permitted him in allotting desirable velocity-ratios to the various gears in the trains of epicyclic gearing employed in epicyclic change-speed gears of the kind described, *i. e.* the kind with the planetary shaft fixed to the driven shaft as aforesaid and having on it planetary pinions that coöperate with each other in the production of the reverse and of certain of the forward speeds, and, in certain cases, the braking. The means through which this greater freedom of choice can be exercised while the advantage is retained of the employment of the planetary shaft (or shafts) fixed to the single driven-shaft by which alone the power as aforesaid is taken out of the mechanism, are planetary pinions so connected together that though they turn simultaneously around the planetary shaft they do so about axes which are not co-axial.

In the accompanying drawings—

Fig. 2 is a longitudinal central section of a three-speed gear constructed according to the present invention;

Like reference-letters indicate like parts throughout the drawing.

Figure 1:
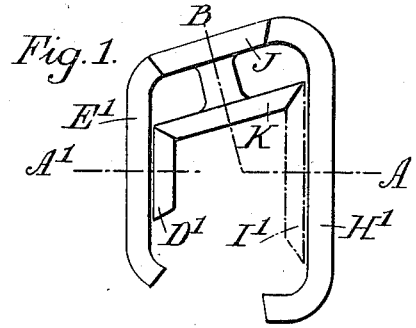
Figure 1 is a diagrammatic view of the wheels and shafts of a "tilted-shaft" gear of the earlier British Patent No. 110,020 aforesaid.

With reference first to Fig. 1 (the previously-known tilted-shaft gear) it will be seen that when either of the sun-wheels $E^1$ or $D^1$ is locked to and turned by the driving-shaft $A^1$ and the corresponding sun-wheel $H^1$ or $I^1$ is held stationary, the tilted shaft B will be carried around by the direct operation of planet pinion J (if $E^1$ be the driver) or K (if $D^1$ be the driver) with the driven shaft A of which B forms a part. But inasmuch as the co-axial planet pinions J and K have their common axis tilted the driven shaft can never have an ahead velocity of rotation of 0.5, taking the velocity of rotation of the driving shaft as unity, because the sun-gears at the opposite ends of a diameter of either planet pinion cannot be of identical size, which they would have to be in this type of gear to enable J or K (considered singly and not as interacting with one another) to impart to A this particular ahead velocity of 0.5.

Further, assuming to commence with that the ratio of the pinion J to the sun-wheel $E^1$ and that of the pinion K to the sun-wheel $D^1$ have been chosen to suit a desired speed of reverse, then, seeing that the pinions J and K have to be co-axial and to be in gear with the sun-wheels $E^1$ $D^1$, the degree of inclination of the axis of the tilted shaft B is thereby fixed as also is the distance apart of the pinions J and K upon it, and in addition, the actual proportions of the sun-wheels $I^1$ and $H^1$.

The succeeding Figs. 2, 3, 4, 5, 6, 7 and 8 show arrangements of four-speed and reverse gear according to the present invention which when provided with electro-magnetic devices for putting a simultaneous check upon the rotation of both the sun-wheels $I^1$ and $H^1$ can be used also as magnetic brakes to retard or stop the shaft B (and with it the shaft A). By omitting from any of them the sun-wheel shown in chain-lines in it the gear becomes a three-speed gear with a reverse. In all of them the gear ratios $\frac{J}{E^1}$, and $\frac{K}{D^1}$ are selected to commence with so that they shall give the desired ratio of reverse to forward speed, and in in all of them the pinions J and K are not co-axial but after settlement of the ratio of the desired reverse by making the ratio $\frac{J}{E^1}$ less, in the desired degree, than $\frac{K}{D^1}$ have been angled one up and the other down, or both up or down to different degrees, or one angled and the other made horizontal (i. e. parallel with the driven shaft) as in Figs. 3, 6, 4 and 7, to suit the desired proportions of the wheels $I^1$ and $H^1$ or of one of these two if the other be absent.

Figure 5:
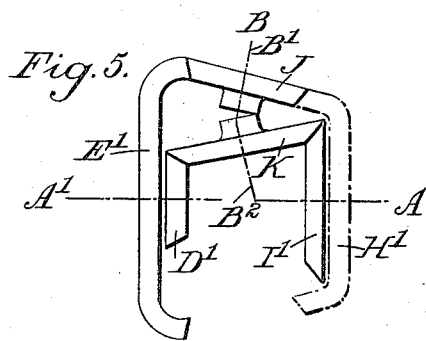
Figure 8:
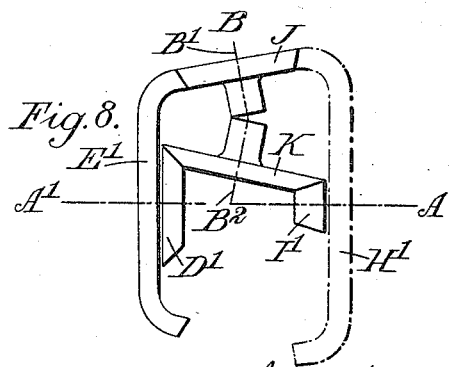

In Figs. 5 and 8 both portions $B^1$ and $B^2$ of the shaft B are at an angle other than ninety degrees with the shaft A, the portions $B^1$ and $B^2$ being tilted in Fig. 5 in directions opposite to those in which they are tilted in Fig. 8.

Now as to the wide range of choice available in settling the proportions of $I^1$ and or $H^1$, had it remained necessary in the improved gears of Figs. 2 to 8 inclusive to keep the planetary pinions J and K co-axial their planes though they might have been inclined, must have been kept parallel and this latter fact would have fixed as hereinbefore explained, the diameters for the sun-wheels $I^1$ and $H^1$; whereas the present invention enables sun-wheels $I^1$ and $H^1$ to be employed of sizes or relative diameters that can be freely selected for the sun-wheel $I^1$ without reference to that selected for the sun-wheel $H^1$ or vice versa and both of these selections can be made without reference to or interference with the desired speed of reverse, the ratios $\frac{J}{E^1} \frac{K}{D^1}$ for which may have been previously selected.

Figure 3:
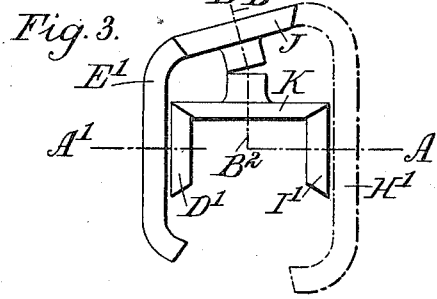
Fig. 3 is a diagrammatic view showing the wheels and shafts of Fig. 2 without the electro-magnetic devices.
Figure 4:
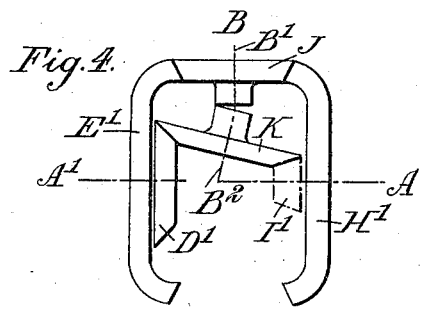
Figs. 4, 5, 6, 7 and 8 are similar diagrammatic views of modified arrangements of the wheels and shafting in similar gears, also according to the present invention.
Figure 6:
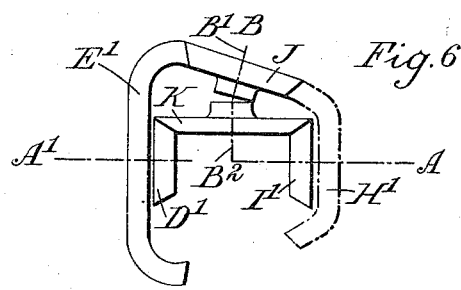
Figure 7:
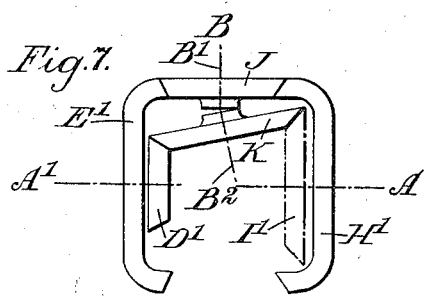

In Figs. 3 and 6 the driven-shaft A can have an ahead velocity of rotation of 0.5 taking the velocity of the driving shaft $A^1$ as unity, because the sun-gears $D^1$ and $E^1$ at the opposite ends of a diameter of K are of equal size. In Figs. 4 and 7 the driven-shaft can have an ahead velocity of rotation of 0.5 imparted to it from the pinion J because the sun-wheels $E^1$ and $H^1$ at opposite ends of a diameter of J are of identical size.

In Figs. 3 to 8 it may be assumed that the wheels J and K are interconnected and caused to rotate about their axis in company, by gearing such as the interconnecting bevel-wheels $j$ and $k$ applied to them in Fig. 2 and hereinafter more particularly referred to; but it is within the present invention to connect the non-coaxial wheels J and K by any suitable means which will cause them both to turn in the same sense though not necessarily at the same angular velocity, about the planetary shaft B, which latter to distinguish it from the straight but tilted planetary shaft of the earlier invention might be termed the "double-bent shaft", inasmuch as one portion of it $B^1$ (see Fig. 2) makes an angle with the other $B^2$, which in its turn is "bent" or formed at a right or other angle with the driven shaft A to which they are fixed and with which they both turn in company.

Although a simple "double-bent shaft" is preferred, the two related and interconnected non-coaxial planet wheels J and K could be supported on any other suitable mounting fixed to the driven shaft A.

In Fig. 2 which includes electro-magnetic devices that are omitted for the sake of clearness from the other figures to which they could be similarly applied, a three-speed gear according to the present invention is illustrated.

This gear comprises a shaft A and arms B, the arms intersecting the shaft and being fixed thereto. The arms B in the example illustrated are at right angles to the shaft A as to the portions $B^2$ of the arms that are nearest to the shaft and are tilted as to the portions $B^1$ toward the fly-wheel F. The arms B receive motion from a motor (which motor actuates the shaft $A^1$ carrying the fly-wheel F) as hereinafter explained, and transmit this motion directly to the driven shaft A controlling the road-wheel of the vehicle or controlling any other device that it is desired to drive, either by being connected directly thereto or by being connected through a Cardan joint C.

In order to obtain the three-speeds in forward running (which include the direct drive) and to obtain the reversal or backward running, a system of magnetic clutches and magnetic brakes is employed, this system comprising the magnetic clutches D and E in connection with the fly-wheel F and therefore rotating at the speed of the motor. It also comprises the magnetic brakes G and I secured to the casing X containing the mechanism, so that the sun-wheels $E^1 I^1$ can when required be held against rotation. The magnetic clutches are supplied with current through any suitable rubbing contacts such as the spring contacts D and E, while the magnetic brakes are supplied with current through the conductors G and I. The said clutches and brakes operate by magnetic attraction their corresponding disks which are connected with the bevel sun-wheels $D^1$ $E^1$ and $I^1$, which wheels are concentric with the shaft A and are always in engagement with the planetary wheels J and K, which latter are not integral with each other, but are rotatably mounted, respectively, on the portions $B^1$ and $B^2$ of the arms B, and are connected together so as to rotate in company around the arm B by means of the inter-connecting bevel wheels $j$ $k$ fixed to the pinions J and K respectively. The armature-disk $D^0$ is non-rotatably engaged by any convenient means with the toothed wheel $D^1$ through the disk $D^3$ keyed on the sleeve carrying the wheel $D^1$. Through the armature-disk $I^0$ extend pins such as $I^2$ which fit and slide endwise in corresponding round holes in the ring $I^3$, the latter being fixed on the long hub of the wheel $I^1$. Thus the disk $I^0$ that is acted upon by the electro-magnet I can engage the toothed wheel $I^1$ so that there shall be no relative motion between them.

The operation of this speed-changing gear, constructed in the example illustrated to give three-speeds in forward running and one slow speed in backward running is as follows:—To obtain the first forward running speed, when the motor shaft $A^1$ has been started, current is sent through the clutch D and brake I. The sun-wheel $D^1$ then rotates at the same speed as the motor and the sun-wheel $I^1$ is held stationary, the planetary wheel K, being constrained to rotate, reacts on the stationary wheel $I^1$ and causes the arms B and consequently the shaft A to move in the direction in which the motor shaft $A^1$ rotates. The forward speed of the shaft A will in this case be one half the speed of rotation of that of the driving motor and shaft $A^1$. The second forward running speed is obtained by sending the current through the clutch E and brake I, in which case the wheels J and K are driven by the wheel $E^1$ and react upon the stationary sun-wheel $I^1$. If the angular velocity of $E^1$ in this case be the same as that of the wheel $D^1$ in the former example, it is obvious that the angular velocity of the pinion J will be greater than it was previously, as also will that of the pinion K, so that the rate at which the wheels J and K run around upon the stationary sun-wheel $I^1$ will be greater than before. The third or 1:1 forward running speed is obtained by passing the current through D and E, causing the sun-wheels $D^1$ $E^1$ to rotate with the same angular velocity; the planetary wheels J and K being thus jammed (the ratio of the numbers of teeth being different) and driving the arms B at the same speed of rotation as that of the clutches D and E, this speed corresponding to the direct drive. The slow reversal or backward running is obtained by causing the current to pass through the clutch D and the brake G. The wheel $D^1$ then runs at the speed of the shaft $A^1$ while the wheel $E^1$ is rendered stationary. The planetary wheels J and the planetary wheels K driven by the pinion $D^1$ are thus constrained to rotate on the shafts B and in this movement they react on the pinion $E^1$ which is stationary, and then take around the arms B and consequently the shaft A in a direction opposite to that of the rotation of the shaft $A^1$. In this way all sorts of graduations of the speeds can be obtained by combining the ratios of the number of teeth which are in engagement in the pairs of toothed wheels $D^1$ $K$ $I^1$ and $E^1$ $J$ $H^1$.

It may be added that although a three-speed gear has been described in detail by way of example, it would be obvious that if a wheel such as $H^1$ shown in chain lines in Fig. 3 were employed it could be controlled like the wheel $E^1$ by an extension to the right hand in Fig. 2, of the electro-magnetic brake G shown in that figure, and the mechanism shown in Fig. 1 could then provide an additional forward speed.

I am aware that it has been heretofore proposed by Ravigneaux (specification of expired British Letters Patent No. 12707/12) to use a tilted planetary shaft in connection with epicyclic speed-gear. According to my invention there is only one way of taking power out of the gear viz. by the single driven shaft A and the tilted planetary shaft is brought into the combination in such a manner as to solve the problem hereinbefore described with reference to a single driven shaft. In Ravigneaux' plan there are in effect three driven shafts, the problem of driving a single shaft at various suitable speeds does not arise and the planetary shaft is brought into the combination in a totally different way.

What I claim as my invention and desire to secure by Letters Patent is:—

1. In an electro-magnetic epicyclic speed-changing gear of the bevel-wheel type, the combination of a drive shaft, a driven shaft, a plurality of driving bevel sun-wheels of different diameters facing one way and arranged coaxial with said shafts, electro-magnetic clutches carried by the drive shaft, one for each of the driving sun-wheels to actuate them either simultaneously or selectively, a relatively stationary electro-magnetic brake appropriated to one of the driving sun-wheels, a bevel sun-wheel additional to and facing the other way from those aforesaid and like them coaxial with said shafts, a relatively stationary electro-magnetic brake appropriated to said additional sun-wheel, a mounting fixed to the driven shaft and constituting the sole means by which rotation is conveyed to the latter, and a plurality of planetary pinions which are rotatable in bearings on said mounting, have their axes at an angle to one another, and are geared to one another so as to rotate in the same sense about their axes, the said pinions being also geared with and positioned intermediate of the aforesaid additional sun-wheel and plurality of sun-wheels.

2. In an electro-magnetic epicyclic speed-changing gear of the bevel-wheel type, the combination of a drive shaft, a driven shaft, a plurality of driving bevel sun-wheels of different diameters facing one way and free to turn coaxially with said shafts, electro-magnetic clutches carried by the drive shaft, one for each of the driving sun-wheels to actuate them either simultaneously or selectively, a relatively stationary electro-magnetic brake appropriated to one of the driving sun-wheels which is larger in diameter relatively to its own planet than is its companion driving sun-gear relatively to the planet of said companion, a bevel sun-wheel additional to and facing the other way from those aforesaid and like them free to turn coaxial with said shafts, a relatively stationary electro-magnetic brake appropriated to said additional sun-wheel, a mounting fixed to the driven shaft and constituting the sole means by which rotation is conveyed to the latter, and a plurality of planetary pinions which are rotatable in bearings on said mounting, have their axes at an angle to one another, and are geared to one another so as to rotate in the same sense about their axes, the said pinions being also geared with and positioned intermediate of the aforesaid additional sun-wheel and the plurality of sun-wheels.

3. In an electro-magnetic epicyclic speed-changing gear of the bevel-wheel type, the combination of a drive shaft, a driven shaft, a plurality of driving bevel sun-wheels of different diameters facing one way and free to turn coaxially with said shafts, electro-magnetic clutches carried by the drive shaft one for each of the driving sun-wheels to actuate them either simultaneously or selectively, a relatively stationary electro-magnetic brake appropriated to one of the driving sun-wheels, a bevel sun-wheel additional to and facing the other way from those aforesaid and like them free to turn coaxially with said shafts, a relatively stationary electro-magnetic brake appropriated to said additional sun-wheel, a mounting, which is a shaft bent intermediate of its ends, fixed to the driven shaft and constituting the sole means by which rotation is conveyed to the latter, and a plurality of planetary pinions which are rotatable about said bent shaft, have their axes at an angle to one another, and are geared to one another so as to rotate in the same sense about their axes, the said pinions being also geared with and positioned intermediate of the aforesaid additional sun-wheel and plurality of sun-wheels.

4. In an electro-magnetic epicyclic speed-changing gear of the bevel-wheel type, the combination of a drive shaft, a driven shaft, a plurality of driving bevel sun-wheels of different diameters facing one way and free to turn coaxially with said shafts, electro-magnetic clutches carried by the drive shaft one for each of the driving sun-wheels to actuate them either simultaneously or selectively, a relatively stationary electro-magnetic brake appropriated to one of the driving sun-wheels which is larger in diameter relatively to its own planet than is its companion driving sun-gear relatively to the planet of said companion, a bevel sun-wheel additional to and facing the other way from those aforesaid and like them free to turn coaxially with said shafts, a relatively stationary electro-magnetic brake appropriated to said additional sun-wheel, a mounting, which is a shaft bent intermediate of its ends, fixed to the driven shaft and constituting the sole means by which rotation is conveyed to the latter, and a plurality of planetary pinions which are rotatable about said bent shaft, have their axes at an angle to one another, and are geared to one another so as to rotate in the same sense about their axes, the said pinions being also geared with and positioned intermediate of the aforesaid additional sun-wheel and plurality of sun-wheels.

In testimony whereof I affix my signature.

GEORGE POLLARD.

Copies of this patent may be obtained for five cents each, by addressing the "Commissioner of Patents, Washington, D. C."